(12) United States Patent
Lee et al.

(10) Patent No.: US 8,970,549 B2
(45) Date of Patent: Mar. 3, 2015

(54) TOUCH SCREEN AND METHOD FOR DRIVING THE SAME

(71) Applicant: Samsung Electro-Mechanics Co., Ltd., Suwon (KR)

(72) Inventors: Hee Bum Lee, Suwon (KR); Dong Sik Yoo, Suwon (KR); Ho Yun Cho, Suwon (KR); Jae Hyuk Jang, Suwon (KR); Yun Ki Hong, Suwon (KR); Kyoung Soo Chae, Suwon (KR)

(73) Assignee: Samsung Electro-Machanics Co., Ltd., Gyunggi-Do (KR)

( * ) Notice: Subject to any disclaimer, the term of this patent is extended or adjusted under 35 U.S.C. 154(b) by 59 days.

(21) Appl. No.: 13/845,023

(22) Filed: Mar. 17, 2013

(65) Prior Publication Data

US 2014/0176486 A1    Jun. 26, 2014

(30) Foreign Application Priority Data

Dec. 26, 2012    (KR) .......................... 10-2012-0153612

(51) Int. Cl.
| | | |
|---|---|---|
| *G06F 3/045* | (2006.01) | |
| *G06F 3/041* | (2006.01) | |
| *G06F 3/044* | (2006.01) | |
| *G06F 3/046* | (2006.01) | |

(52) U.S. Cl.
CPC ............... *G06F 3/0416* (2013.01); *G06F 3/044* (2013.01); *G06F 3/046* (2013.01)
USPC .......................................... 345/174; 345/173

(58) Field of Classification Search
USPC ................................ 345/156, 173–175, 179; 178/18.01–18.07, 19.01–19.05
See application file for complete search history.

(56) References Cited

U.S. PATENT DOCUMENTS

| | | | |
|---|---|---|---|
| 2012/0154327 A1* | 6/2012 | Liu ............................. | 345/174 |
| 2013/0076670 A1* | 3/2013 | Wu et al. ..................... | 345/173 |

FOREIGN PATENT DOCUMENTS

| | | |
|---|---|---|
| JP | 09-138730 | 5/1997 |
| JP | 2006-085489 | 3/2006 |
| JP | 2007-287118 | 11/2007 |
| JP | 2008-141733 | 6/2008 |
| JP | 3160091 | 5/2010 |

(Continued)

OTHER PUBLICATIONS

Office action dated Dec. 17, 2014 from corresponding Korean Patent Application No. 10-2012-0153612 and its English summary provided by the clients.

(Continued)

*Primary Examiner* — Ricardo L Osorio
(74) *Attorney, Agent, or Firm* — Ladas & Parry, LLP

(57) ABSTRACT

Disclosed herein are a touch screen and a method for driving the same. The touch screen includes: a switching unit including a plurality of switches connected to traces of driving lines and sensing lines of the touch screen, respectively; a sensing unit sensing capacitance and electromagnetic resonance (EMR) according to a switching operation of the switching unit; and a main controlling unit controlling the switching operation of the switching unit according to an operation mode of the touch screen. Therefore, it is possible to improve sensitivity of sensing without increasing a bezel region of the touch screen. In addition, the EMR and the capacitance may be sensed using the same trace structure, and an antenna pattern may be formed and operated as an antenna.

12 Claims, 8 Drawing Sheets

(56) References Cited

FOREIGN PATENT DOCUMENTS

| JP | 2013-069270 | 4/2013 |
| KR | 10-2009-0033659 | 4/2009 |
| KR | 10-2011-0127197 | 11/2011 |
| KR | 10-1209514 | 12/2012 |
| WO | 2010/089059 A1 | 8/2010 |

OTHER PUBLICATIONS

Office action dated Jan. 7, 2014 from corresponding Japanese Patent Application No. 2013-083416 and its English summary provided by the clients.

* cited by examiner

TOUCH SCREEN AND METHOD FOR DRIVING THE SAME

CROSS REFERENCE TO RELATED APPLICATION

This application claims the benefit of Korean Patent Application No. 10-2012-0153612, filed on Dec. 26, 2012, entitled "Touch Screen and Method for Driving the Same", which is hereby incorporated by reference in its entirety into this application.

BACKGROUND OF THE INVENTION

1. Technical Field

The present invention relates to a touch screen and a method for driving the same.

2. Description of the Related Art

Development of a smart mobile system has actually contributed to a rapid change in all aspects of our lives. Things possible only in a specific space have become possible regardless of time and place. For example, work conducted by an e-mail during movement or work of accessing the Internet to search information has been now naturally performed routinely. The reason is that miniaturization of a system has become possible and a memory having a high capacity of a gigabyte or more has been implemented by a single chip, due to the development of a semiconductor manufacturing technology, and a high performance and low power consumption processor technology has become possible due to the development of a circuit technology. A revolution of the mobile system as described above has been implemented through a smart phone or a tablet personal computer (PC). The mobile system has become miniaturized, advanced, and smart through innovation of an input device. Input devices such as a keyboard and a mouse that have been used in a fixed type computer may be restrictions fatal to the mobile system due to a physical limitation such as a size thereof, a weight thereof, or the like. However, these restrictions may be effectively solved by a touch screen. The touch screen does not require an additional space and enables an effective and advanced input such as a multi-touch. Since the touch screen is operated by a contact between a finger and the touch screen, a user may naturally feel a tactile feedback when the touch screen is touched.

For example, since Apple's iPod Touch has emerged, a touch interface has been used as a user input means in various mobile devices such as iPhone, iPad, Galaxy, Galaxy Note, and the like.

Regardless of a form of a change in an appearance of a mobile system that will evolve in the future, the evolution of an input system for developing the mobile system has been continuously conducted.

As a scheme of sensing a touch of the touch screen as described above, there are mainly two schemes, that is, capacitance sensing and electromagnetic resonance (EMR) sensing.

First, in the capacitance sensing, a change of capacitance generated at the time of a touch by a human body or a specific object is sensed. A difference between a minute change value in capacitance generated when the human body touches a surface to be touched and a set value is sensed to generate a final output. A touched portion in a touch sensor is made of a metal. When a current flows to the metal portion, the touch sensor enters an operation standby state. In this case, when the user touches a switch with his/her hand, electricity flows in the human body, such that a voltage is changed in a short time and an output of an internal circuit is changed in response to the changed voltage.

Meanwhile, in the EMR sensing, a coil embedded in a pen transmits and receives a frequency in a specific region generated in a terminal sensor in an electromagnetic induction scheme to sense writing pressure, speed, coordinate information of the pen. More specifically, when very minute energy is induced in a magnetic field generated in a surface sensor board by a resonant circuit of the pen, the resonant circuit of the pen may again return a magnetic signal to the surface sensor board using the energy. A surface may be configured of an electronic pen in which a sensor unit formed of a coil and the resonant circuit are embedded.

Since the capacitance sensing and the EMR sensing are performed by different methods as described above, it is difficult to implement the capacitance sensing and the EMR sensing in a single touch screen.

The following Prior Art Document (Patent Document) relates to a touch screen. More specifically, this Patent document has disclosed a method of implementing a hybrid type touch panel by combining a projective capacitive touch panel and a pressure-sensitive touch panel with each other.

PRIOR ART DOCUMENT

Patent Document (Patent Document 1) Korean Patent Laid-Open Publication No. 2011-0127197 (WO 2010/089059 (Aug. 12, 2010))

SUMMARY OF THE INVENTION

The present invention has been made in an effort to provide a touch screen capable of being used as an antenna as well as sensing capacitance or electromagnetic resonance (EMR) according to switching of a switch connected to a trace in the touch screen, and a method for driving the same.

According to a preferred embodiment of the present invention, there is provided a touch screen including: a switching unit including a plurality of switches connected to traces of driving lines and sensing lines of the touch screen, respectively; a sensing unit sensing capacitance and electromagnetic resonance (EMR) according to a switching operation of the switching unit; and a main controlling unit controlling the switching operation of the switching unit according to an operation mode of the touch screen.

The switching unit may include: a first switching unit connected to each of the traces of the driving lines and switching a corresponding switch according to the operation mode of the touch screen to connect the corresponding switch to a driving line selected by a driving selecting multiplexer (MUX), thereby forming a closed loop pattern; and a second switching unit connected to each of the traces of the sensing lines and switching a corresponding switch according to the operation mode of the touch screen to connect the corresponding switch to a sensing line selected by a sensing MUX, thereby forming a closed loop pattern.

The switching unit may be implemented by a semiconductor device and include a memory structure.

The sensing unit may include: a capacitance sensing unit switching at least one switch of the first and second switching units to connect the driving lines and the sensing lines to one another and sensing an input signal by a touch based on the driving lines and the sensing lines connected to one another to judge a change in the capacitance due to the input signal; and an EMR sensing unit switching at least one switch of the first switching unit to connect the driving lines to one another and sensing the input signal by the touch based on the driving lines connected to one another to sense EMR in a Y axis direction due to the input signal, and switching at least one switch of the second switching unit to connect the sensing lines to one another and sensing the input signal based on the sensing lines connected to one another to sense EMR in an X axis direction due to the input signal.

The touch screen may further include an antenna unit performing switching operations of the first and second switching units according to the operation mode of the touch screen to form the traces of the driving lines and the sensing lines of the touch screen in an antenna pattern having a loop structure, thereby performing communication with an external apparatus or power transmission to the external apparatus.

The antenna unit may include: a first antenna unit implemented by connecting the driving lines of the touch screen to one another in the antenna pattern according to the switching of the first switching unit; and a second antenna unit implemented by connecting the second lines of the touch screen to one another in the antenna pattern according to the switching of the second switching unit.

The antenna unit may further include a third antenna unit implemented by connecting external traces for power transmission and communication to one another in the antenna pattern at an outer side of the traces of the driving lines and the sensing lines of the touch screen.

According to another preferred embodiment of the present invention, there is provided a method for driving a touch screen, including: (A) judging an operation mode of the touch screen; (B) switching corresponding switches of switching units connected to traces of driving lines and sensing lines of the touch screen, respectively, according to the operation mode of the touch screen to generate the traces of the touch screen in a closed loop pattern; and (C) sensing capacitance or EMR from the closed loop pattern generated according to the operation mode of the touch screen.

The step (B) may include: (B1) switching a corresponding switch of a first switching unit connected to each of the traces of the driving lines according to the operation mode of the touch screen to connect the corresponding switch to a driving line selected by a driving selecting MUX, thereby forming a closed loop pattern; and (B2) switching a corresponding switch of a second switching unit connected to each of the traces of the sensing lines according to the operation mode of the touch screen to connect the corresponding switch to a sensing line selected by a sensing MUX, thereby forming a closed loop pattern.

The step (C) may include: (C1) switching at least one switch of the first and second switching units according to the operation mode of the touch screen to connect the driving lines and the sensing lines to one another; and (C2) sensing an input signal by a touch based on the driving lines and the sensing lines connected to one another to judge a change in the capacitance due to the input signal.

The step (C) may include: (C3) switching at least one switch of the first switching unit according to the operation mode of the touch screen to connect the driving lines to one another; (C4) switching at least one switch of the second switching unit to connect the sensing lines to one another; (C5) sensing an input signal by a touch based on the driving lines connected to one another to sense EMR in a Y axis direction due to the input signal; and (C6) sensing the input signal based on the sensing lines connected to one another to sense EMR in an X axis direction due to the input signal.

The method may further include (D) forming an antenna pattern to be operated as an antenna in the closed loop pattern generated according to the operation mode of the touch screen.

The step (D) may include: (D1) connecting the driving lines of the touch screen to one another in the antenna pattern according to the switching of the first switching unit; and (D2) connecting the sensing lines of the touch screen to one another in the antenna pattern according to the switching of the second switching unit.

The step (D) may further include: (D3) connecting external traces for power transmission and communication to one another in the antenna pattern at an outer side of the traces of the driving lines and the sensing lines of the touch screen.

BRIEF DESCRIPTION OF THE DRAWINGS

The above and other objects, features and advantages of the present invention will be more clearly understood from the following detailed description taken in conjunction with the accompanying drawings, in which:

FIGS. 3A and 3B are conceptual diagrams for describing a double routing pattern according to the preferred embodiment of the present invention, wherein FIG. 3A is a conceptual diagram showing a single routing pattern in the case in which a switch is opened; and FIG. 3B is a conceptual diagram showing a double routing pattern in the case in which the switch is closed;

DESCRIPTION OF THE PREFERRED EMBODIMENTS

Figure 1:
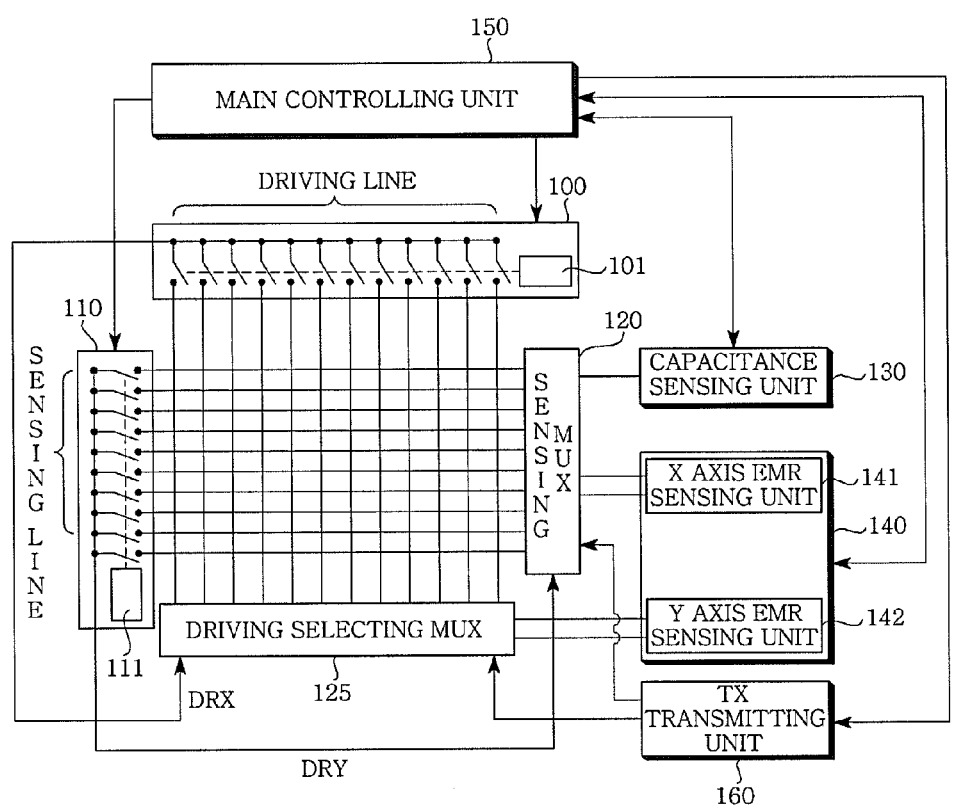
FIG. 1 is a schematic configuration diagram showing a touch screen according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Hereinafter, although it is assumed in a preferred embodiment of the present invention that a touch screen includes a capacitive sensing medium having a plurality of row traces or driving lines and a plurality of column traces or sensing lines for convenience of explanation, another sensing medium may also be used. The row trace and the column trace in the touch screen may be made of a transparent conductive medium such as indium tin oxide (ITO), antimony tin oxide (ATO), or the like, it may also be made of another transparent material and a non-transparent material such as copper, or the like. Although the row trace and the column trace may be disposed to be perpendicular to each other in some embodiments, they may also be disposed in other non-Cartesian orientations in other embodiments. For example, in polar coordinates, the sensing lines may be concentric circle lines, and the driving lines may be radially extended lines (and vice versa). Therefore, terms "row" and "column", "column direction driving line", and "row direction driving line" may include intersecting traces (concentric lines and radial lines of a polar coordinate arrangement) having other one-dimensional and two-dimensional geometrical configurations as well as an orthogonal grid, as used in the present specification. The rows and the columns may be formed at one side or both sides of a substantially transparent substrate separated by a substantially transparent dielectric material, or on two separate substrates separated from each other by a dielectric material.

FIG. 1 is a schematic configuration diagram showing a touch screen according to a preferred embodiment of the present invention.

Referring to FIG. 1, the touch screen according to the preferred embodiment of the present invention may be configured to include a first switching unit 100, a second switching unit 100, a sensing multiplexer (MUX) 120, a driving selecting MUX 125, a capacitance sensing unit 130, an electromagnetic resonance (EMR) sensing unit 140, and a main controlling unit 150.

The first switching unit 100 may include a plurality of switches connected to traces of driving lines of the touch screen to perform switching. The switching may be performed by a switching semiconductor device. In the case in which a specific switch is closed, a plurality of driving lines may be connected to one another to allow resistors of the traces to be arranged in a double routing pattern in an X axis direction. The double routing pattern will be described in detail with reference to FIG. 3.

The second switching unit 110 may include a plurality of switches connected to traces of sensing lines of the touch screen to perform switching. The switching in the second switching unit 110 may be performed using a switching semiconductor device. In the case in which a specific switch is closed, a plurality of sensing lines may be connected to one another to allow resistors of the traces to be arranged in a double routing pattern in a Y axis direction.

The sensing MUX 120 may be connected to the sensing lines to multiplex results sensed in the touch screen.

The driving selecting MUX 125 may be connected to the driving lines and be used to apply a predetermined voltage to the driving lines.

The sensing MUX 120 and the driving selecting MUX 125 may also be formed as a single MUX structure.

The capacitance sensing unit 130 may be used to sense a change in capacitance to sense a touch point, and the EMR sensing unit 140 may be used to detect EMR.

According to the preferred embodiment of the present invention, a structure for sensing the capacitance and the EMR may be implemented in a single layer, and the traces are formed in the double routing structure using a semiconductor switch device including a memory, thereby making it possible to increase sensitivity of sensing for all the traces.

Briefly describing this with reference to FIG. 1, the first switching unit 100 including a memory structure (for example, a state memory) 101 are connected to the driving lines to change a resistor structure of the traces into the double routing pattern, thereby making it possible to decrease trace resistance. In this case, a magnitude of a signal input to the driving selecting MUX 125 capable of scanning a change in a voltage generated in the X axis direction may be increased, and sensitivity of sensing for the input signal in the X axis direction may be increased. For example, at the time of performing the EMR sensing in the X axis direction, a closed loop structure is formed in the double routing pattern, such that existing trace resistance is decreased, thereby making it possible to increase the sensitivity of the sensing for the input signal in the X axis direction.

Likewise, the second switching unit 110 including memory structure (for example, a state memory) 111 is connected to the sensing lines to change a structure of the traces, thereby making it possible to decrease trace resistance. The second switching unit 110 may increase sensitivity of EMR sensing and capacitance sensing for the input signal in the Y axis direction, similar to a role of the first switching unit 100.

The main controlling unit 150, which generally controls the touch screen according to the preferred embodiment of the present invention, particularly controls switching operations of the first and second switching units 100 and 110 to form a closed loop by corresponding driving lines and sensing lines, thereby making it possible to allow a touch point to be sensed by the capacitance or the EMR.

In addition, the main controlling unit 150 controls the switching operations of the first and second switching units 100 and 110 to form an antenna pattern having a loop structure by corresponding driving lines and sensing lines, thereby making it possible to allow the antenna pattern to serve as an antenna. The main controlling unit 150 will be described in more detail with reference to FIGS. 2 to 7.

Hereinafter, in the preferred embodiment of the present invention, a specific method for sensing capacitance and a method for sensing EMR using a switching structure will be described.

Figure 2:
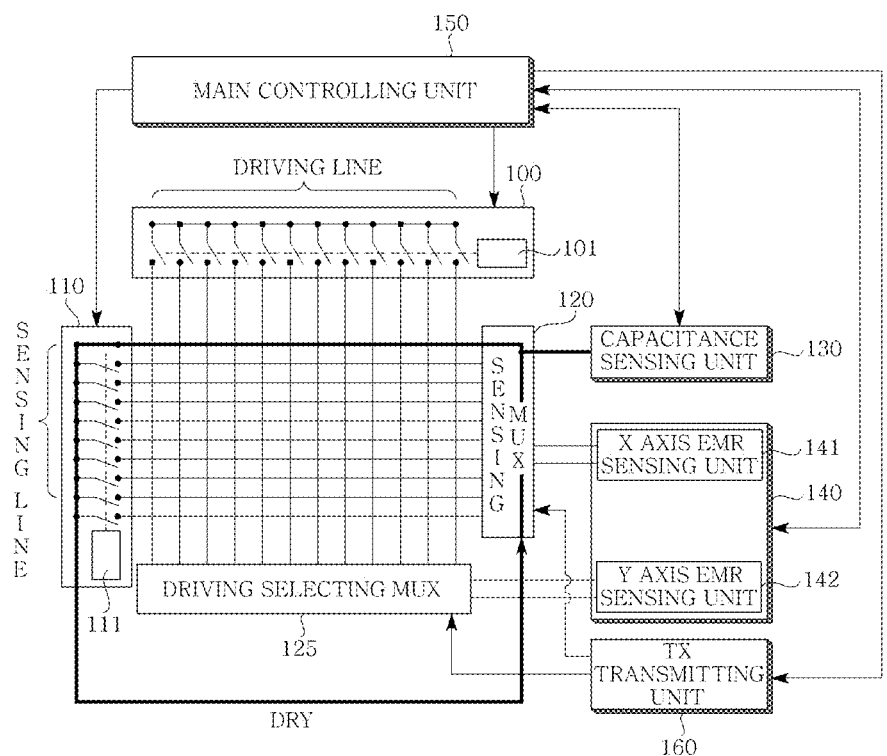
FIG. 2 is a conceptual diagram showing a method for sensing capacitance according to the preferred embodiment of the present invention.

FIG. 2 is a conceptual diagram showing a method for sensing capacitance according to the preferred embodiment of the present invention.

Referring to FIG. 2, a specific switch among switches included in the second switching unit 110 in order to sense the capacitance may be closed. In the case in which a switch of a specific position in the second switching unit 110 is closed, resistors of the traces for sensing the capacitance may have the double routing pattern. In the case in which an upper end switch of the second switching unit 110 is connected, a trace structure of the sensing lines of the touch screen may form one closed loop. In this case, since the resistance of the trace is decreased, a magnitude of a signal input to the capacitance sensing unit 130 and sensitivity of sensing for the input signal may be increased.

In order to control the switch, only a specific switch structure for performing the sensing among a plurality of switches is controlled to be closed based on a switching control signal transmitted from the outside, thereby making it possible to form a closed loop for performing the sensing. Hereinafter, the double routing pattern as described above will be described in more detail with reference to FIGS. 3A and 3B.

Figure 3A:
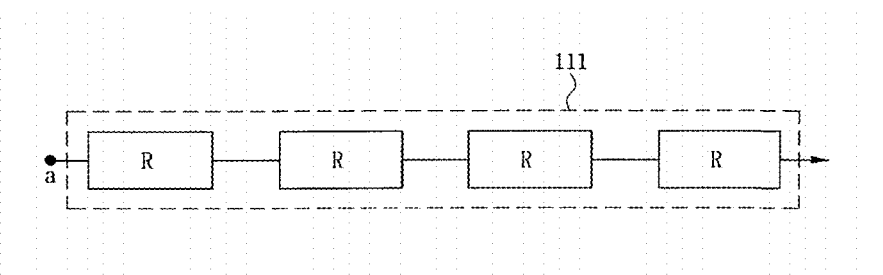
Figure 3B:
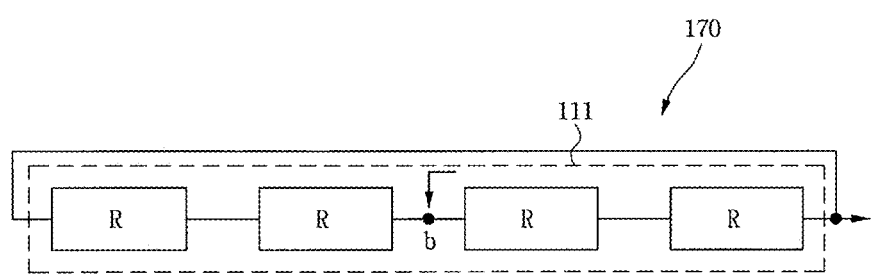

FIGS. 3A and 3B are conceptual diagrams for describing a double routing pattern according to the preferred embodiment of the present invention, wherein FIG. 3A is a conceptual diagram showing a single routing pattern in the case in which a switch is opened; and FIG. 3B is a conceptual diagram showing a double routing pattern in the case in which the switch is closed.

For example, in the case in which it is assumed that four resistors having R ohm are present in the trace, a single routing pattern has a structure in which four resistors are connected in series with one another. Since resistance of each of the resistors is R ohm, the entire resistance may have a value corresponding to 4R ohm. However, in the case of using the double routing pattern, four resistors are connected in parallel with one another. In the case in which it is assumed that resistance of each of the four resistors is R ohm, since the entire resistance has a value corresponding to R ohm, it is decreased from 4R ohm to 1R ohm, that is, ¼. That is, the switching structure is used to decrease the resistance of the trace, thereby making it possible to increase the sensing sensibility for the input signal. In addition, since a magnitude of a signal sensed with respect to the input signal is large, a touch screen may also be configured to have a larger area as compared with an existing touch screen.

Further, the switching unit 100 or 110 including the memory structure 101 or 111 performing double routing switching is used, thereby making it possible to implement the double routing structure using a small amount of trace without separately increasing a bezel width in the touch screen. The above-mentioned switch structure may be a structure in which it is formed of a semiconductor, such that a specific switch of the switching unit is selectively operated when sensing the capacitance.

Accordingly, as shown in FIG. 3A, a driving signal is sequentially allowed from a sensing multiplexer (MUX) on driving lines intersected with sensing lines when the double routing structure is not formed by the second switching unit 110 toward a left direction. Since the resistance of the sensing lines forms a structure connected in series, a maximum value of the sensing line is 4R ohm when the driving signal is allowed to the driving line positioned at a farthest point (a) from the sensing multiplexer (MUX).

However, when the double routing structure 170 is formed (as shown in FIG. 3B), the other side of the sensing line 111 connecting the sensing multiplexer (MUX) to one side of the sensing line is connected to common node of the sensing multiplexer (MUX) by the second switching unit 110. Thus, the resistance value becomes maximized at a middle point (b) of the sensing line 111. Also, when the driving signal is sequentially allowed from a sensing multiplexer (MUX) on driving lines intersected with sensing lines toward the left direction, the resistance of the sensing line is formed in parallel structure based on the point where the driving signal is allowed. When the driving signal is allowed to the driving line positioned at the middle point (b), the resistance at both sides is formed in a parallel structure based on the middle point (b). As a result, the minimum value of the sensing line can be 1R ohm so that the sensitivity of sensing in the touch screen can be improved further.

Figure 4:
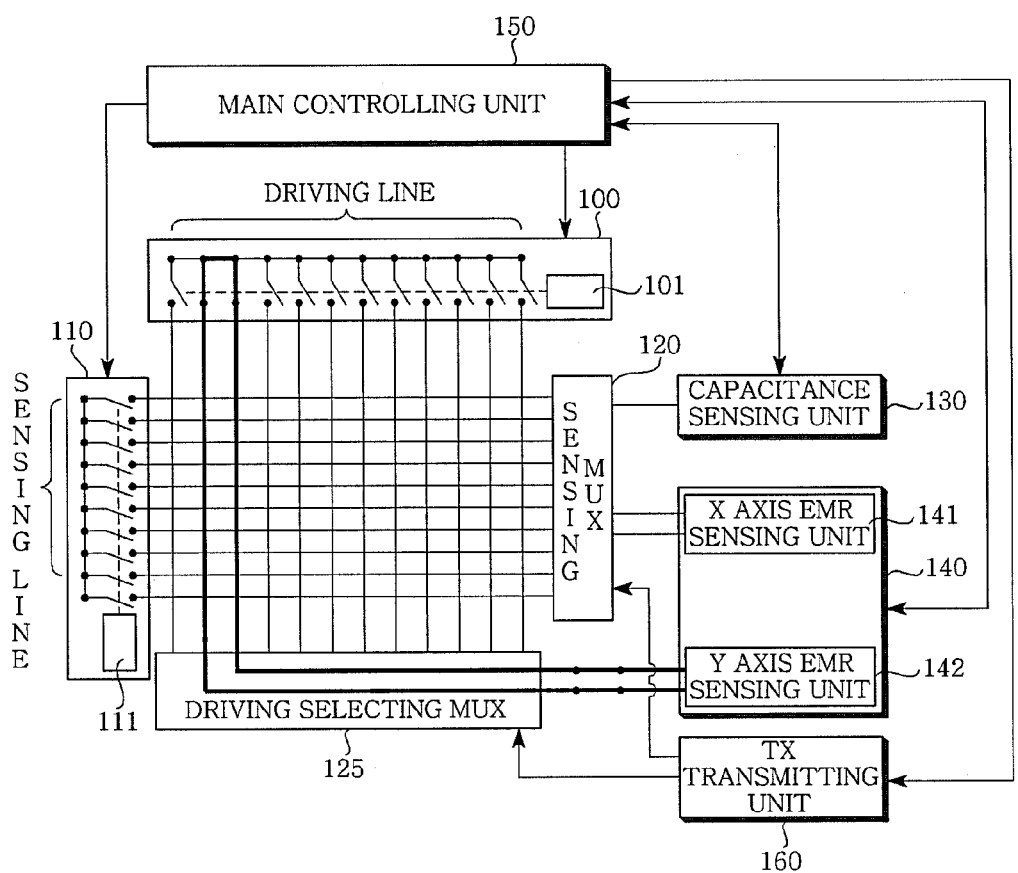
FIG. 4 is a conceptual diagram showing a method for sensing electromagnetic resonance (EMR) (Y axis EMR) according to the preferred embodiment of the present invention.

FIG. 4 is a conceptual diagram showing a method for sensing electromagnetic resonance (EMR) (Y axis EMR) according to the preferred embodiment of the present invention.

Referring to FIG. 4, a switch included in the first switching unit 100 and present at a specific position is closed in order to sense the EMR in the Y axis direction, thereby making it possible to form a closed loop structure. For example, a specific switch positioned in the first switching unit 100 is closed, thereby making it possible to form a closed loop with a Y axis direction EMR sensing unit 142 connected to the driving selecting MUX 125.

That is, the switch structure such as the first and second switching units 100 and 110 is used to form the double routing structure as shown in FIG. 2, thereby making it possible to increase sensitivity of the EMR sensing.

The first and second switching units 100 and 110 may also perform a switching operation based on a semiconductor device. Only a specific switch for performing the EMR sensing among a plurality of switches is closed based on the switching control signal transmitted from the outside, thereby making it possible to form the closed loop for the EMR sensing. The EMR in the Y axis direction may be sensed from the closed loop.

Figure 5:
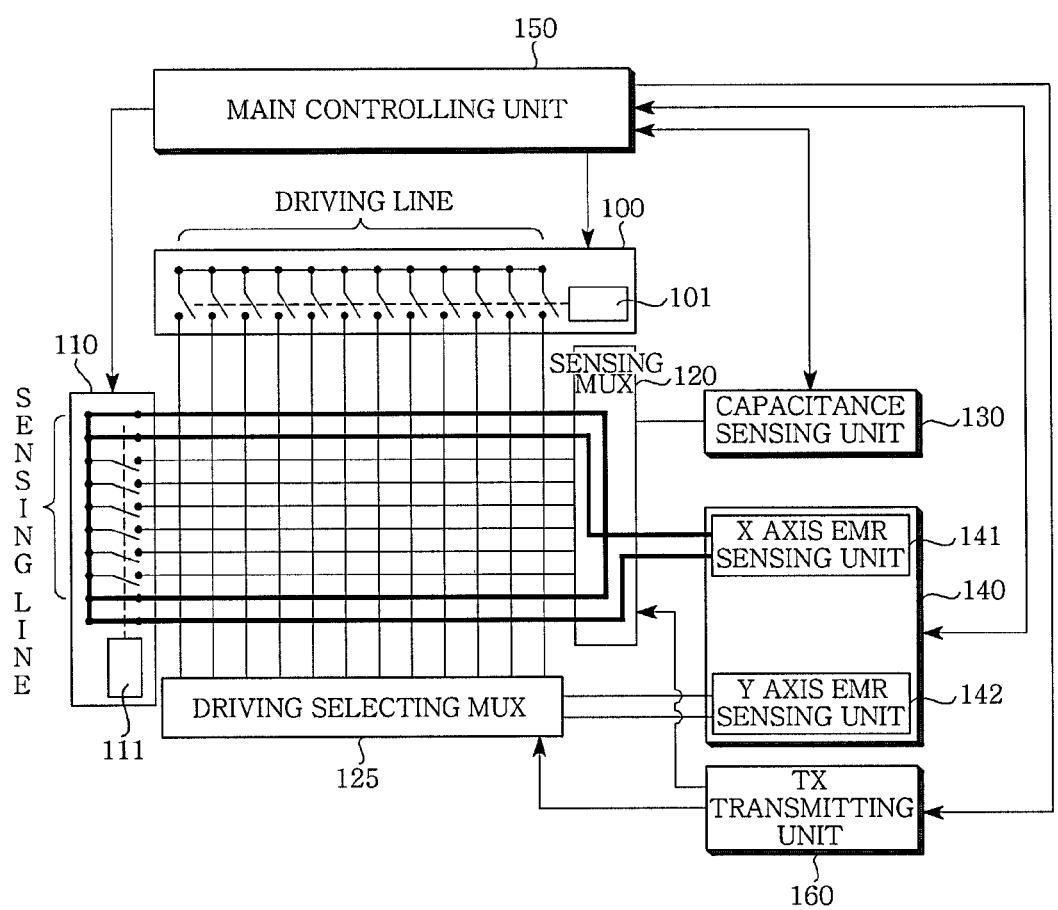
FIG. 5 is a conceptual diagram showing a method for sensing EMR (X axis EMR) according to the preferred embodiment of the present invention.

FIG. 5 is a conceptual diagram showing a method for sensing EMR (X axis EMR) according to the preferred embodiment of the present invention.

Referring to FIG. 5, a switch included in the second switching unit 110 and present at a specific position is closed in order to sense the EMR in the X axis direction, thereby making it possible to form a closed loop structure. For example, a plurality of switches positioned in the second switching unit 110 and present at a specific position are closed, thereby making it possible to form a closed loop with an X axis direction EMR sensing unit 141 connected to the sensing MUX 120. The EMR in the X axis direction may be sensed from the closed loop.

Meanwhile, the touch screen according to the preferred embodiment of the present invention may further include an antenna unit 170a, 170b, and 170c implemented by forming an antenna pattern having a loop structure according to a switching control of the first and second switching units 100 and 110. The above-mentioned antenna unit 170a, 170b, or 170c will be described below in more detail with reference to FIGS. 6A to 6C.

Figure 6A:
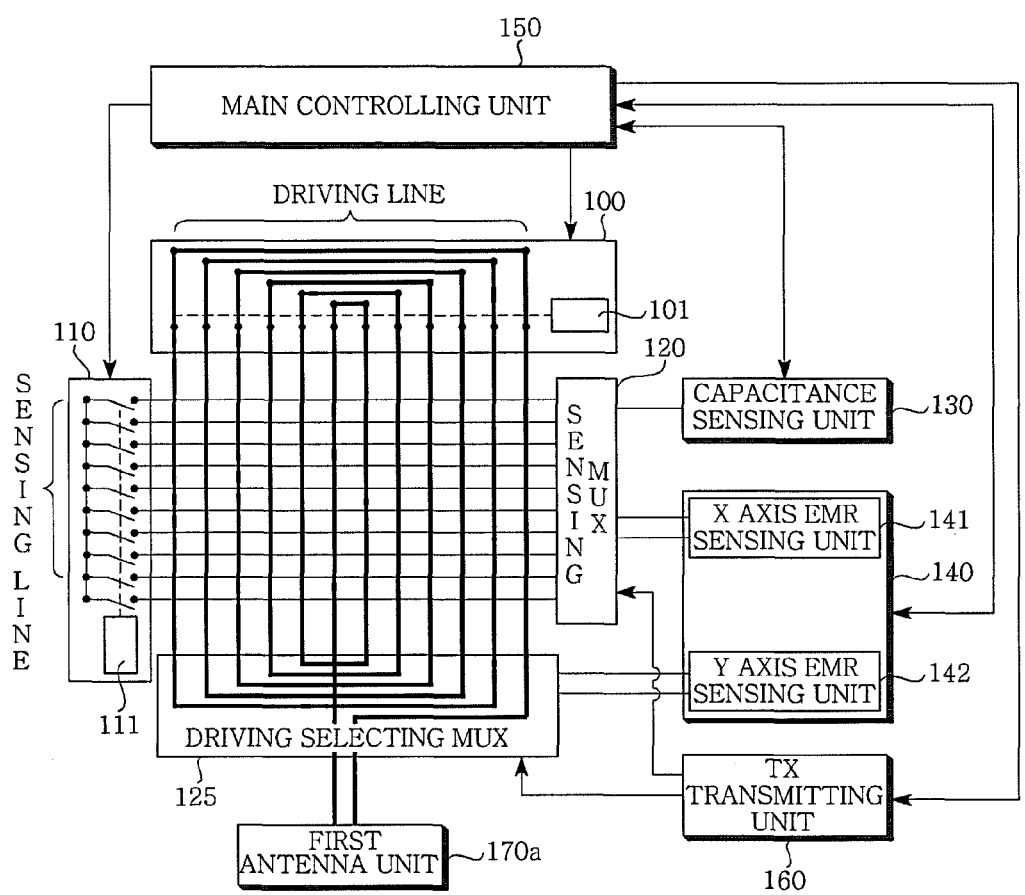
FIGS. 6A to 6C are conceptual diagrams showing an antenna structure using switching according to the preferred embodiment of the present invention.
Figure 6B:
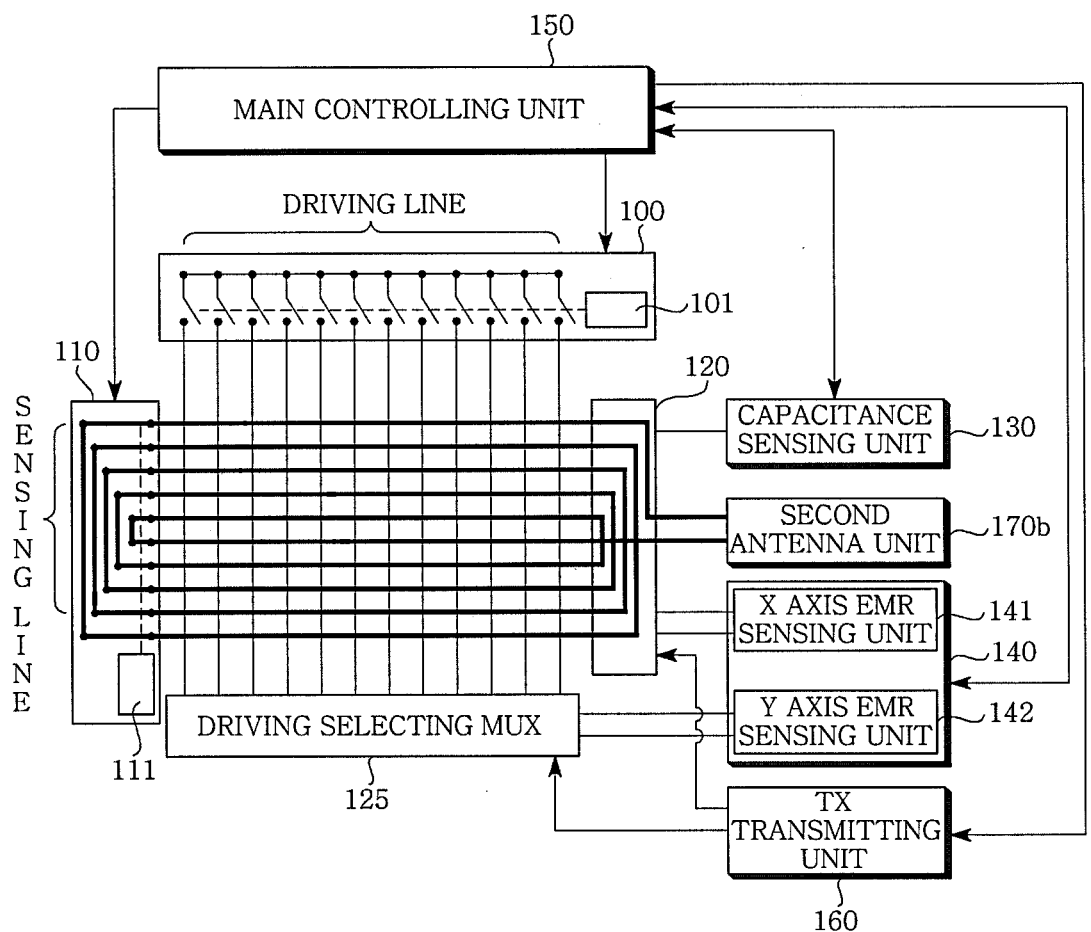
Figure 6C:
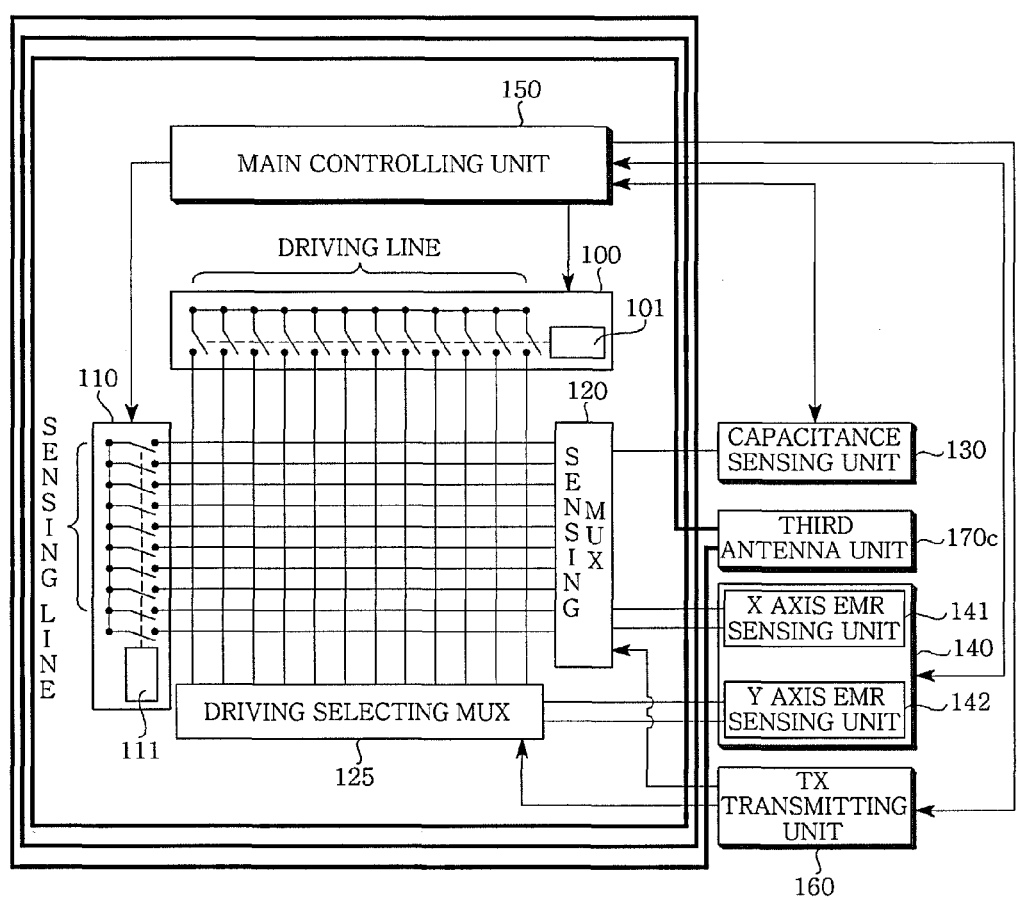

FIGS. 6A to 6C are conceptual diagrams showing an antenna structure using switching according to the preferred embodiment of the present invention.

Referring to FIGS. 6A to 6C, the main controlling unit 150 may allow the first and second switching units 100 and 110 to be switched so that the traces of the driving lines and the sensing lines, the driving selecting MUX, and the sensing MUX of the touch screen form the loop structure, to form the antenna pattern having the loop structure and allow the antenna pattern to be used for short range communication.

More specifically, in FIG. 6A, a method of forming an antenna structure using the first switching unit 100 included the touch screen according to the preferred embodiment of the present invention is shown.

Referring to FIG. 6A, the touch screen according to the preferred embodiment of the present invention may further include a first antenna unit 170a implemented using the trace structure included in the touch screen, the plurality of switches included in the first switching unit 100, and the driving selecting MUX 125 and used as a loop type antenna. For example, the switches in the first switching unit 100 may be connected to one another, and the switches connected to one another, the driving lines, and the driving selecting MUX 125 may form the antenna having the loop structure. The loop structure formed as described above may serve as the antenna to thereby be used for the short range communication. In addition, the loop structure may also be used for power transmission in a magnetic induction scheme using induced current based on a coil structure.

In FIG. 6B, a method of forming an antenna structure using the second switching unit 110 included the touch screen according to the preferred embodiment of the present invention is shown.

Referring to FIG. 6B, the touch screen according to the preferred embodiment of the present invention may further include a second antenna unit 170b implemented using the trace structure included in the touch screen, the plurality of switches included in the second switching unit 110, and the sensing MUX 120 and used as a loop type antenna, similar to the touch screen shown FIG. 6A. For example, the switches in the second switching unit 110 may be connected to one another, and the switches connected to one another, the second lines, and the sensing MUX 120 may form the antenna having the loop structure. The loop structure formed as described above may also serve as the antenna to thereby be used for the short range communication. In addition, the loop structure may also be used for power transmission in a magnetic induction scheme using induced current based on a coil structure.

In FIG. 6C, a method of forming an antenna structure using external traces for power transmission and communication added at an outer side of the traces of the touch screen according to the preferred embodiment of the present invention is shown.

Referring to FIG. 6C, the touch screen according to the preferred embodiment of the present invention may further include a third antenna unit 170c implemented at an outer side of the first switching unit 100, the second switching unit 110, the sensing MUX 120, and the driving selecting MUX 125 and used as a loop type antenna. The antenna having the loop structure at the outer side may be used for power transmission or short range communication in the touch screen.

Figure 7:
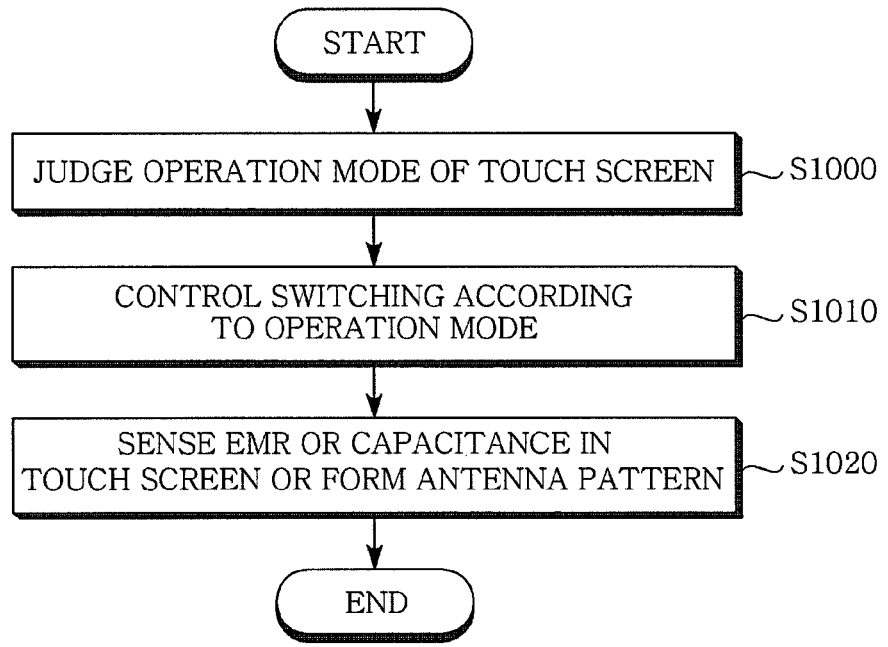
FIG. 7 is a conceptual diagram showing a method for driving a touch screen according to the preferred embodiment of the present invention.

FIG. 7 is a conceptual diagram showing a method for driving a touch screen according to the preferred embodiment of the present invention.

Referring to FIG. 7, in the method for driving a touch screen according to the preferred embodiment of the present invention, the main controlling unit 150 judges an operation mode of the touch screen (S1000).

That is, the first and second switching units 100 and 110 are switched according to the operation mode of the touch screen, thereby making it possible to allow the sensing lines and the driving lines of the touch screen to sense the capacitance, sense the EMR, or form the antenna structure. Since different switching operations may be performed in the respective switching units 100 and 110 according to which operation is performed in the touch screen, the operation mode of the touch screen may be judged.

Then, the main controlling unit 150 may control the switches of the first and second switching units 100 and 100 according to the operation mode of the touch screen (S1010).

In order to control the first and second switching units 100 and 110, the control signal transmitted from the main controlling unit 150 may be used. The control may be performed so as to sense the capacitance, sense the EMR, or operate corresponding switches of corresponding switching units 100 and 110 in order to form the antenna structure, according to the control signal transmitted from the main controlling unit 150.

Then, the input signal (capacitance and EMR) by the touch in the touch screen is sensed or the antenna pattern to be operated as the antenna is formed, based on the switch controlled as described above (S1020).

As described above, although the method for sensing the capacitance and the method for sensing the EMR may be used at the time of sensing the input signal for different uses in the touch screen, with the touch screen and the method for driving the same according to the preferred embodiment of the present invention, it is possible to sense the capacitance and the EMR using one driving line and sensing line rather than separate spaces in the touch screen panel. That is, it is possible to sense both of the capacitance and the EMR according to the switching control of the first and second switching units 100 and 110 connected to the traces of the driving lines and the sensing lines of the touch screen, respectively.

Therefore, the touch screen according to the preferred embodiment of the present invention may more accurately perform the sensing according to the sensing object by sensing both of the capacitance and the EMR.

According to the preferred embodiments of the present invention, the switching units connected to each of the traces of the driving lines and the sensing lines of the touch screen are switched to form the trace resistors in the double routing structure, thereby making it possible to improve the sensitivity of the sensing without increasing a bezel region of the touch screen.

In addition, the EMR and the capacitance may be sensed using the same trace structure, and the antenna pattern may be formed and operated as the antenna.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch screen comprising:
a switching unit including a first switching unit and a second switching unit comprised of a plurality of switches connected to traces formed on one side of driving lines and sensing lines of the touch screen, respectively;
a sensing unit sensing capacitance or electromagnetic resonance (EMR) according to a switching operation of the switching unit; and
a main controlling unit controlling the switching operation of the switching unit according to an operation mode of the touch screen,
when the operation mode of the touch screen is capacitance sensing mode, the main controlling unit controls the first switching unit and a driving selecting multiplexer (MUX) so that the plurality of switches of the first switching unit and the traces formed on one side of the driving lines can form a double routing structure electrically connected each other, and the main controlling unit controls the second switching unit and a sensing multiplexer (MUX) so that the plurality of switches of the second switching unit and the traces formed on one side of the sensing lines can form a double routing structure electrically connected each other, and
when the operation mode of the touch screen is electro magnetic resonance (EMR) sensing mode, the main controlling unit controls the first switching unit and the driving selecting multiplexer (MUX), the plurality of switches of the first switching unit and the traces formed on one side of the driving line are electrically connected each other in order to form a closed loop pattern, and the main controlling unit controls the second switching unit and the sensing multiplexer (MUX), the plurality of switches of the second switching unit and the traces formed on one side of the sensing line are electrically connected each other in order to form a closed loop pattern.

2. The touch screen as set forth in claim 1, wherein the switching unit is implemented by a semiconductor device and includes a memory structure.

3. The touch screen as set forth in claim 1, wherein the sensing unit includes:
 a capacitance sensing unit switching at least one switch of the first and second switching units to connect the driving lines and the sensing lines to one another and sensing an input signal by a touch based on the driving lines and the sensing lines connected to one another to judge a change in the capacitance due to the input signal; and
 an EMR sensing unit switching at least one switch of the first switching unit to connect the driving lines to one another and sensing the input signal by the touch based on the driving lines connected to one another to sense EMR in a Y axis direction due to the input signal, and switching at least one switch of the second switching unit to connect the sensing lines to one another and sensing the input signal based on the sensing lines connected to one another to sense EMR in an X axis direction due to the input signal.

4. The touch screen as set forth in claim 1, further comprising an antenna unit performing switching operations of the first and second switching units according to the operation mode of the touch screen to form the traces of the driving lines and the sensing lines of the touch screen in an antenna pattern having a loop structure, thereby performing communication with an external apparatus or power transmission to the external apparatus.

5. The touch screen as set forth in claim 4, wherein the antenna unit includes:
 a first antenna unit implemented by connecting the driving lines of the touch screen to one another in the antenna pattern according to the switching of the first switching unit; and
 a second antenna unit implemented by connecting the second lines of the touch screen to one another in the antenna pattern according to the switching of the second switching unit.

6. The touch screen as set forth in claim 5, wherein the antenna unit further includes a third antenna unit implemented by connecting external traces for power transmission and communication to one another in the antenna pattern at an outer side of the traces of the driving lines and the sensing lines of the touch screen.

7. A method for driving a touch screen, comprising:
 (A) judging an operation mode of the touch screen;
 (B) switching corresponding switches of switching units connected to traces of driving lines and sensing lines of the touch screen, respectively, according to the operation mode of the touch screen to generate the traces of the touch screen in a closed loop pattern; and
 (C) sensing capacitance or EMR according to the operation mode of the touch screen,
 when the operation mode of the touch screen is capacitance sensing mode, the step (B) includes controlling the switching unit and a driving selecting multiplexer (MUX), forming a double routing structure which the plurality of switches of the first switching unit and the traces formed on one side of the driving lines are electrically connected each other, controlling the switching unit and a sensing multiplexer (MUX), and forming a double routing structure which the plurality of switches of the second switching unit and the traces formed on one side of the sensing lines are electrically connected each other, and
 when the operation mode of the touch screen is electro magnetic resonance (EMR), the step (B) includes controlling the switching unit and the driving selecting multiplexer (MUX), electrically connecting the plurality of switches of the first switching unit and the traces formed on one side of the driving line each other, forming a closed loop pattern, controlling the switching unit and the sensing multiplexer (MUX), electrically connecting the plurality of switches of the second switching unit and the traces formed on one side of the sensing line each other, and forming a closed loop pattern.

8. The method as set forth in claim 7, wherein the step (C) includes:
 (C1) switching at least one switch of the first and second switching units according to the operation mode of the touch screen to connect the driving lines and the sensing lines to one another; and
 (C2) sensing an input signal by a touch based on the driving lines and the sensing lines connected to one another to judge a change in the capacitance due to the input signal.

9. The method as set forth in claim 7, wherein the step (C) includes:
 (C3) switching at least one switch of the first switching unit according to the operation mode of the touch screen to connect the driving lines to one another;
 (C4) switching at least one switch of the second switching unit to connect the sensing lines to one another;
 (C5) sensing an input signal by a touch based on the driving lines connected to one another to sense EMR in a Y axis direction due to the input signal; and
 (C6) sensing the input signal based on the sensing lines connected to one another to sense EMR in an X axis direction due to the input signal.

10. The method as set forth in claim 7, further comprising (D) forming an antenna pattern to be operated as an antenna in the closed loop pattern generated according to the operation mode of the touch screen.

11. The method as set forth in claim 10, wherein the step (D) includes:
 (D1) connecting the driving lines of the touch screen to one another in the antenna pattern according to the switching of the first switching unit; and
 (D2) connecting the sensing lines of the touch screen to one another in the antenna pattern according to the switching of the second switching unit.

12. The method as set forth in claim 11, wherein the step (D) further includes:
 (D3) connecting external traces for power transmission and communication to one another in the antenna pattern at an outer side of the traces of the driving lines and the sensing lines of the touch screen.

* * * * *